2 Sheets--Sheet 1.

P. K. DEDERICK.
Baling-Press.

No. 161,766.

Patented April 6, 1875.

Fig. 1.

Witnesses:
A. W. Dederick
G. W. Merchant

Inventor.
Peter K. Dederick

THE GRAPHIC CO.PHOTO-LITH.39 & 41 PARK PLACE,N.Y.

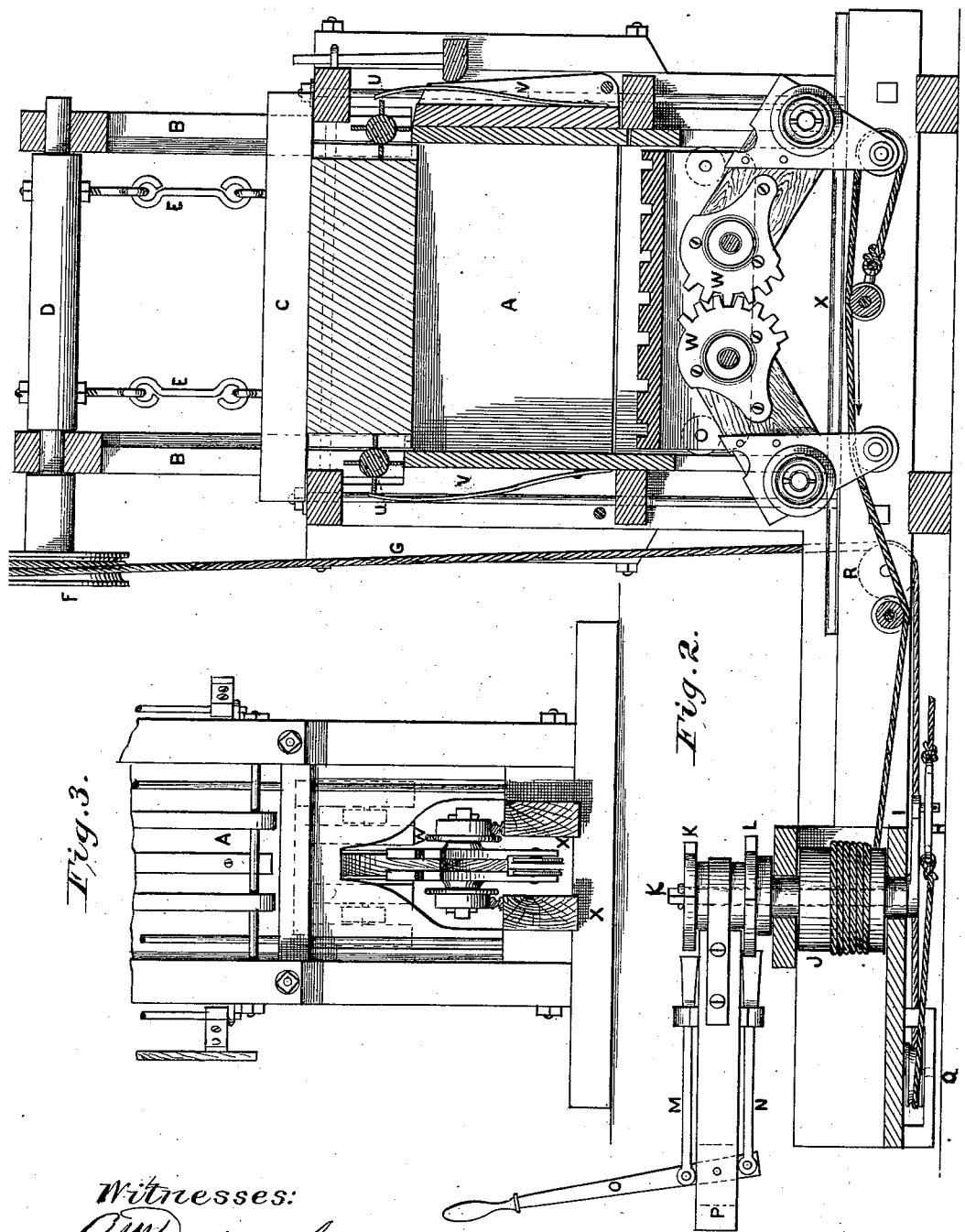

UNITED STATES PATENT OFFICE.

PETER K. DEDERICK, OF ALBANY, NEW YORK.

IMPROVEMENT IN BALING-PRESSES.

Specification forming part of Letters Patent No. 161,766, dated April 6, 1875; application filed July 13, 1874.

*To all whom it may concern:*

Be it known that I, PETER K. DEDERICK, of Albany, in the county of Albany, State of New York, have invented certain Improvements in Baling-Presses, of which the following is a specification:

My invention consists in a toggle feed device or pressing arrangement, applied to the top of vertical presses, and operated by the capstan from the ground through means of ropes, chains, or equivalent constructions by gearing; also, in the construction and combination of the adjusting mechanism of the crank and capstan, and in the construction of the retaining-guards at the top of the box, for retaining the loose hay.

Figure 1 is a side elevation. Fig. 2 is a bisectional elevation of machine in same position. Fig. 3 is a sectional end elevation.

Similar letters indicate similar parts.

A is the frame and box of a press, which is constructed in the ordinary manner. B B are guides for the tramper C, there being four of them, two on the opposite side from those shown. D is a shaft or roller, to which are attached toggles E E. These may be constructed very light when used only for tramping or feeding; but when used for both feeding and pressing, as in presses heretofore patented by me, then they will require to be much stronger and heavier than shown. The roller D is secured to timbers connecting the tops of the guides B, and at its end is attached a wheel, F, to which the operating-ropes G are attached, said ropes G passing around pulley R, one on each side at the foot of the press, and connecting with the bar or swivel H on the crank I, the one end of the rope first passing around the pulley Q, so as to attach to the swivel from the opposite direction. The crank I is secured to a shaft passing through the capstan-drum J, and having a ratchet, K, secured to it at the top, thus making its attachment and detachment from the power or horse lever P, through means of the lever O and bar M, very convenient. The capstan-drum J, with ratchet L and slide N, is similarly operated, and the same as on presses in ordinary use. T, Fig. 1, is a wedge-shaped piece, one at each side of the press, projecting a little within the box, and retained by the springs S S. These are forced back by the hay in passing, but resume their position and assist in retaining the material when the tramper is withdrawn. U U, Fig. 2, are retaining-rollers at the ends of the press, and are provided with blades or ribs. They revolve with the loose material as it is fed into the box, but are retained by the springs V V from turning back, thus operating similar to an ordinary retaining-wheel, and at the same time preventing the pressed material from passing from the box, through means of the blades or ribs projecting over or within the edge of the box. W W are the levers of a railway-press, moving on track-timbers X, and having their upper ends secured to a follower, as shown.

In operation, the horse is attached to the lever P, Fig. 2, and the slide M attached to the ratchet K. In moving around the horse will revolve the crank, which will cause the rope to render or give length to one end of the rope, and take it up on the other, thus revolving the wheel F, roller D, and causing the toggles E E to assume the position as in Fig. 1, and the tramper C to be raised, as shown, so as to admit the loose material. The horse continuing the revolution, the tramper, at the end of one round, again assumes the position of Fig. 2, thus forcing the loose material past the retaining-guards T and U; and the operation is thus continued, each round adding another section within the box until it is filled, the follower and power W being forced back as the box is filled, and afterward used to repress the entire mass into a compact bale through means of the rope connecting to the capstan-drum J; or the power at the bottom may be removed, and the bales be ejected at the bottom, in a manner similar to the continuously-operating presses heretofore patented by me.

Having thus fully described my invention, I claim—

1. In a baling-press, the combination of the roll D, tramper C, and toggle or jointed connection E, constructed and operating as and for the purposes set forth.

2. In a baling-press, the retaining-rolls U U, substantially as and for the purpose set forth.

3. The retaining-wedge T, in combination with the springs S and box A, substantially as and for the purpose set forth.

4. The combination of the ropes G, swivel H, crank I, shaft and ratchet K, capstan-drum J, and horse-lever P, substantially as and for the purpose set forth.

PETER K. DEDERICK.

Witnesses:
A. M. DEDERICK,
G. W. MERCHANT.